US011520591B2

(12) United States Patent
Fatehi et al.

(10) Patent No.: US 11,520,591 B2
(45) Date of Patent: Dec. 6, 2022

(54) FLUSHING OF INSTRUCTIONS BASED UPON A FINISH RATIO AND/OR MOVING A FLUSH POINT IN A PROCESSOR

(71) Applicant: International Business Machines Corporation, Armonk, NY (US)

(72) Inventors: Ehsan Fatehi, Austin, TX (US); Richard J. Eickemeyer, Rochester, MN (US); John B. Griswell, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/832,845

(22) Filed: Mar. 27, 2020

(65) Prior Publication Data

US 2021/0303311 A1 Sep. 30, 2021

(51) Int. Cl.
*G06F 9/38* (2018.01)

(52) U.S. Cl.
CPC .......... *G06F 9/3855* (2013.01); *G06F 9/3867* (2013.01)

(58) Field of Classification Search
CPC .... G06F 9/3855; G06F 9/3867; G06F 9/3851; G06F 9/3861
See application file for complete search history.

(56) References Cited

U.S. PATENT DOCUMENTS

| 6,694,425 | B1 | 2/2004 | Eickemeyer | |
|---|---|---|---|---|
| 7,086,035 | B1* | 8/2006 | Mericas | G06F 9/3842 712/E9.05 |
| 7,657,891 | B2* | 2/2010 | Jensen | G06F 9/30087 718/102 |
| 9,690,583 | B2 | 6/2017 | Gschwind et al. | |
| 10,049,043 | B2 | 8/2018 | Greenhalgh | |
| 10,509,739 | B1* | 12/2019 | Gudipati | G06F 9/4881 |
| 2004/0216103 | A1* | 10/2004 | Burky | G06F 9/3851 718/100 |
| 2005/0166037 | A1* | 7/2005 | Barrick | G06F 9/3859 712/220 |
| 2005/0228972 | A1* | 10/2005 | Eisen | G06F 9/3836 712/218 |
| 2006/0184769 | A1* | 8/2006 | Floyd | G06F 9/3836 712/216 |
| 2009/0249349 | A1* | 10/2009 | Bose | G06F 9/4893 718/103 |
| 2010/0031006 | A1* | 2/2010 | El-essawy | G06F 9/3891 712/206 |
| 2011/0093861 | A1* | 4/2011 | Flemming | G06F 9/5011 718/104 |

(Continued)

*Primary Examiner* — Shawn Doman
(74) *Attorney, Agent, or Firm* — Scully, Scott, Murphy & Presser, P.C.

(57) ABSTRACT

Processing data in an information handling system is disclosed that includes: in response to an event that triggers a flushing operation, calculate a finish ratio, wherein the finish ratio is a number of finished operations to a number of at least one of the group consisting of in-flight instructions, instructions pending in a processor pipeline, instructions issued to an issue queue, and instructions being processed in a processor execution unit; compare the calculated finish ratio to a threshold; and if the finish ratio is greater than the threshold, then do not perform the flushing operation. Also disclosed is moving the flush point.

19 Claims, 8 Drawing Sheets

(56) References Cited

U.S. PATENT DOCUMENTS

| | | | |
|---|---|---|---|
| 2012/0173848 A1* | 7/2012 | Sun | G06F 9/3834 |
| | | | 712/205 |
| 2012/0278595 A1* | 11/2012 | Indukuru | G06F 9/3867 |
| | | | 712/219 |
| 2013/0007418 A1* | 1/2013 | Fleischman | G06F 9/3865 |
| | | | 712/216 |
| 2013/0290649 A1* | 10/2013 | Jorgensen | H03K 21/38 |
| | | | 711/154 |
| 2015/0268711 A1* | 9/2015 | Ramani | G06F 1/3203 |
| | | | 713/320 |
| 2015/0301830 A1* | 10/2015 | Wiencke | G06F 9/30047 |
| | | | 712/207 |
| 2016/0357554 A1* | 12/2016 | Caulfield | G06F 9/3836 |
| 2017/0139716 A1* | 5/2017 | Caulfield | G06F 9/3851 |
| 2017/0300328 A1* | 10/2017 | Cordes | G06F 9/3836 |
| 2018/0260326 A1* | 9/2018 | Alexander | G06F 12/0859 |

\* cited by examiner

FLUSHING OF INSTRUCTIONS BASED UPON A FINISH RATIO AND/OR MOVING A FLUSH POINT IN A PROCESSOR

BACKGROUND

Embodiments presented herein are related to handling and processing data and/or improving an information handling or data processing system, and more specifically, to reduce flushing operations in a processor pipeline.

Modern information and data handling systems often execute instructions out of order to achieve greater processing efficiency. To handle executing out-of-order instructions, processors typically are "pipelined" and have multiple elements that operate in parallel to process multiple instructions in a single processing cycle. Pipelining involves processing instructions in stages, so that the pipelined stages may process a number of instructions concurrently. To improve throughput, processors may include multiple pipelines or execution slices within each processor core. Multiple execution slices may be used as part of simultaneous multi-threading within a processor core.

Typically, a processor pipeline refers to a set of data processing circuitry or hardware units arranged in series within a processor. The processor pipeline usually includes a number of stages, and may include an "instruction fetch" stage where an instruction is fetched from memory. In a "decode" stage, the instruction is decoded into different control bits, which in general designate (i) a type of functional unit (e.g., execution unit) for performing the operation specified by the instruction, (ii) source operands for the operation, and (iii) destinations for results of the operation. In a "dispatch" stage, the decoded instruction is dispatched to an issue queue (ISQ) where instructions wait for data and an available execution unit. Next, an instruction in the issue queue (ISQ) typically is issued to an execution unit in an "execution" stage. The "execution" stage processes the operation as specified by the instruction. Executing an operation specified by an instruction typically includes accepting data, e.g., one or more operands, and producing one or more results. There are usually registers, caches, and queues associated with the execution units and/or the issue queue (ISQ) to hold data, information and/or instructions for the execution units.

An out of order processor typically executes instructions as soon as its operands are available (and valid), independent of the original instruction sequence. Consequently, as these processors execute out-of-order instructions, they generate numerous temporary results. The temporary values become complete or permanent values when the corresponding instructions are complete. Executing instructions out-of-order creates additional complexity in handling and processing instructions. In out-of-order processors, an instruction can change a register value before all of the prior instructions complete. If any of the prior instructions cause an exception or interruption, then all of the sequential instructions prior to the time of the exception, e.g., an interruptible instruction, generally will be flushed. As a result, the registers allocated to the instructions being flushed will also need to be flushed.

In some cases, balance flushes are used when a processor is processing more than one thread of instructions simultaneously, e.g., working in SMT mode, to free up resources while a processor waits, for example, because a L3-cache or translation lookaside buffer (TLB) miss. One of the complexities in handling and processing out-of-order instructions is restoring the processor state in the event of a balance flushing operation. In this regard, the processor pipeline will need to be restored to the state it was in before the flushing operation. Typically the data is recovered from the history buffers and/or other roll-back mechanisms that deal with flushing and speculation like reorder buffers, and memory to place the processor pipeline in the condition that existed before the flush operation. Even though balance flushes can provide performance boosts, it can hurt some workloads, and flushing and recovering the contents of the processor pipeline can introduce latency and delay to a processor. It would be beneficial to improve processor and/or system flushing to recoup some of the work performed by the processor and increase processor performance and/or efficiency.

SUMMARY

The summary of the disclosure is given to aid understanding of an information handling or computer system, their architectural structures and methods of operation; a processor and a processor pipeline, their architectural structures and methods of operation, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the information handling system and/or computer system and their architectural structures; and a processor, a processor pipeline, and their architectural structure; and their methods of operation to achieve different effects.

Certain aspects of the present disclosure provide a system, a processor, a processor pipeline, a memory subsystem, a product, programming instructions, and/or a method or process of handling and/or processing data. In an embodiment a method of processing data in an information handling system is disclosed that includes: in response to an event that triggers a flushing operation, calculate a finish ratio, wherein the finish ratio is a number of finished operations to a number of at least one of the group consisting of in-flight instructions, instructions pending in a processor pipeline, instructions issued to an issue queue, and instructions being processed in a processor execution unit; compare the calculated finish ratio to a threshold; and if the finish ratio is greater than the threshold, then do not perform the flushing operation. In an aspect, the event triggers a balance flushing operation, and if the finish ratio is greater than the threshold, then do not perform the balance flushing operation, and if the finish ratio is not greater than the threshold, then perform the balance flushing operation. The threshold is at least one of the group consisting of a fixed threshold, a predetermined threshold, a variable threshold, and a programmable threshold. The finish ratio in an aspect is based upon the number of finished instructions in at least one of the group consisting of an Instruction Completion Table, a Global Completion Table, and a reorder buffer, and in a further aspect is determined on a per thread basis. In an embodiment, the method further includes in response to the finish ratio not being greater than the threshold, move the flush point to a point other than the instruction after a next to complete instruction. In an aspect, the flushing point is moved to a next (e.g., a first) unfinished instruction after the next to complete instruction.

A further method of processing data in an information handling system is disclosed in one or more embodiments that includes: in response to an event that triggers a flushing operation, determine a next to complete (NTC) instruction; move a flush point to a not complete or unfinished load instruction after the NTC instruction, wherein the flush point identifies the instruction from which younger instructions in the information handling system are flushed; and perform the flushing operation. The method in an aspect further includes determining the next unfinished instruction in an instruction completion table after the NTC instruction and calculate the adjusted finish ratio, wherein the adjusted finish ratio is the number of finished instructions after the NTC instruction in the instruction completion table divided by the number of instructions after the NTC instruction in the instruction completion table; determining whether the adjusted finish ratio for that next unfinished instruction in the instruction completion table is greater than a threshold; and if the adjusted finish ratio is not greater than the threshold, move the point in the instruction completion table at which instruction will be flushed to the unfinished instruction whose adjusted finish ratio is not greater than the threshold. In one or more embodiments, the method further includes: if the adjusted finish ratio is greater than the threshold, do not move the flush point to that unfinished instruction and proceed to the next unfinished instruction; determine whether the adjusted finish ratio for that next unfinished instruction in the instruction completion table is greater than a threshold; and if the adjusted finish ratio is not greater than the threshold, move the point in the instruction completion table at which instruction will be flushed to the unfinished instruction whose adjusted finish ratio is not greater than the threshold.

In a further embodiment an information handling system is disclosed having a processor having a processor pipeline that includes: an issue queue for holding instructions until data is local to the processor; one or more execution units for executing instructions received from the issue queue; and an instruction completion table having a plurality of entries for tracking instructions that are pending and instructions that are finished and not complete, wherein the processor is configured to issue instructions to the one or more execution units out of order and the instructions are marked as complete in order. The processor in one or more aspects is configured to: in response to an event that triggers a flushing operation, calculate a finish ratio, wherein the finish ratio is a number of instructions marked as finished in the instruction complete table to a number of instructions in the instruction complete table; compare the calculated finish ratio to a threshold; and if the finish ratio is greater than the threshold, then do not perform the flushing operation. The processor is further configured to: calculate the finish ratio on a per thread basis, not perform a balance flushing operation if the finish ratio is greater than the threshold, and perform the balanced flushing operation if the finish ratio is not greater than the threshold. In another aspect, the processor is further configured to in response to the finish ratio not being greater than the threshold, move a flushing point in the instruction completion table to the next or first unfinished instruction (or in an aspect, the last consecutive finished instruction) after the next to complete instruction in the instruction completion table.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The various aspects, features, and embodiments of the information handling system, computer system, computer architectural structure, processor, processor pipeline, memory subsystem, and their methods of operation will be better understood when read in conjunction with the figures provided. Embodiments are provided in the figures for the purpose of illustrating aspects, features, and/or various embodiments of an information handling or computer system and their architectural structures; processor, processor pipeline and their architectural structures; memory subsystems and their architectural structures; and their methods of operation, but the claims should not be limited to the precise arrangement, structures, subassemblies, circuitry, modules, units, features, aspects, mechanisms, methods, processes, techniques, embodiments, or devices shown, and the arrangements, structures, subassemblies, circuitry, modules, units, features, aspects, mechanisms, methods, techniques, processes, embodiments, and devices shown may be used singularly or in combination with other arrangements, structures, subassemblies, circuitry, modules, units, features, aspects, mechanisms, methods, processes, techniques, embodiments, and devices.

DETAILED DESCRIPTION

Figure 1:
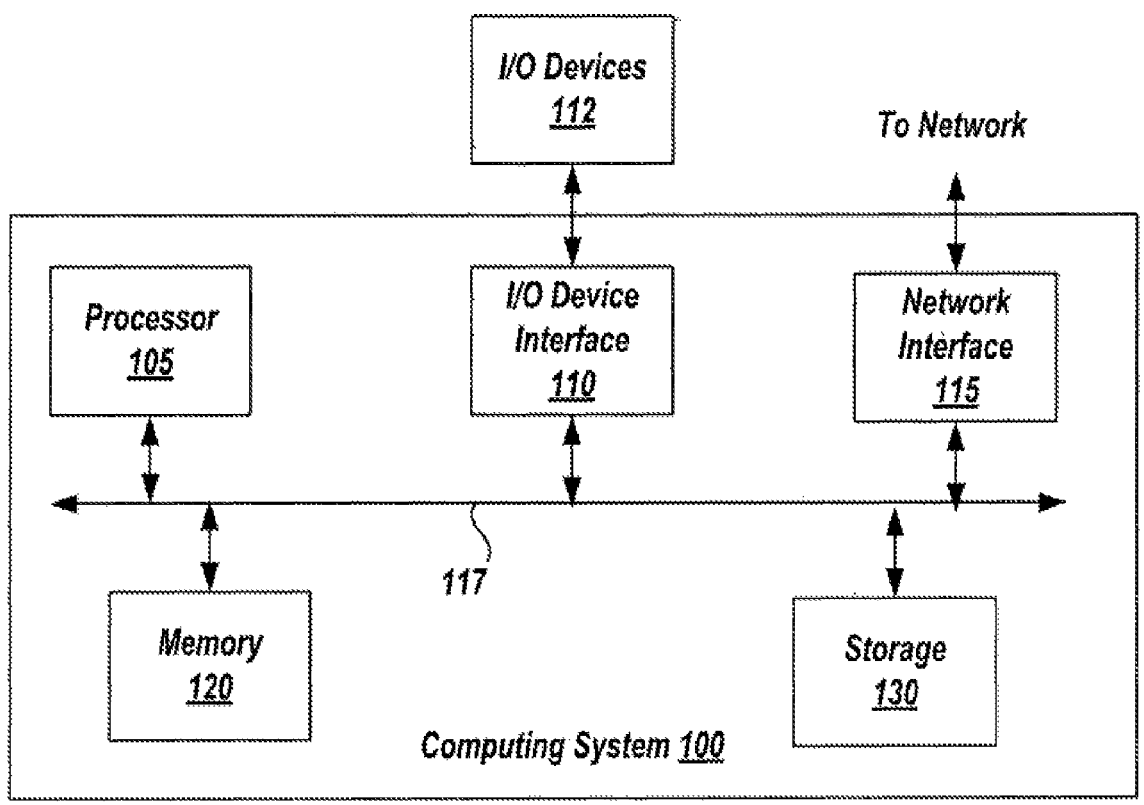
FIG. 1 illustrates an example computing or information handling system, according to one or more embodiments of the present disclosure.

The following description is made for illustrating the general principles of the invention and is not meant to limit the inventive concepts claimed herein. In the following detailed description, numerous details are set forth in order to provide an understanding of information handling systems, computer systems, information handling or computer system architectural structures, processors, processor pipelines, memory subsystems, and their architectural structures and methods of operation, however, it will be understood by those skilled in the art that different and numerous embodiments of the information handling or computer systems, information handling or computer architectural structures, processors, processor pipelines, memory subsystems, and their architectural structures and methods of operation may be practiced without those specific details, and the claims and invention should not be limited to the arrangements, structures, subassemblies, circuitry, modules, (functional) units, features, mechanisms, aspects, processes, methods, techniques, embodiments, devices, or details specifically described and shown herein. Further, particular features, structures, functional units, mechanism, and techniques described herein can be used in combination with other described features, structures, functional units, mechanisms, and techniques in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified.

The following discussion omits or only briefly describes conventional features of computer and/or information handling systems, including processors, processor pipelines, and microprocessor systems, their architecture and method of operation; and memory subsystems, their architecture, and method of operation, which are apparent to those skilled in the art. It is assumed that those skilled in the art are familiar with the general architecture and operation of computer and information handling systems; the general architecture and operation of processors, processor pipelines, and in particular with processors which operate in an out-of-order execution fashion, including multi-slice processors; and the general architecture and operation of memory subsystems; including the fetching and transfer of data between processors and memory subsystems. It may be noted that a numbered element is numbered according to the figure in which the element is introduced, and is typically referred to by that number in succeeding figures.

Embodiments presented herein disclose systems and techniques for improving processor efficiency and power consumption. The system and method in one or more embodiments reduces the number or amount of times a system and/or processor is flushed. The system and method in one or more embodiments moves the flushing point to reduce the number of instructions that are flushed. The system and/or processor and processor pipeline, in one or more aspects, performs flushing operations in a more intelligent manner to reduce flushing operations, and in an aspect to gain performance in flushing situations where processor performance may suffer because of overly aggressive flushing operations.

In one or more embodiments, before undergoing a flushing operation, the amount of instructions in a thread that are finished is considered, and in an aspect compared to a performance threshold, and if the number of completed or finished operations are above the threshold, the processor does not undertake a flushing operation. For example, a ratio of the number of instructions that are finished versus the number of instructions that are in-flight and being processed (pending) in the processor pipeline is calculated, preferably on a per thread basis. If that ratio of finished to pending instructions is greater than a threshold, for example eighty percent (80%), then the processor pipeline is not flushed, and in an aspect the processor will not flush on a per thread basis. In another embodiment, where a flushing operation takes place, instead of flushing the next to complete (NTC) instruction, as in typical systems, the system will move the flush point to flush the next instruction that is not finished after the NTC instruction, preferably on a thread basis. In other words, the processor in an aspect will flush the pipeline starting at the next (first) unfinished instruction after the NTC instruction, and in an aspect preferably on a per thread basis. In another embodiment, the processor will move the flush point to flush at the last consecutive finished instruction after the NTC instruction, preferably on a thread basis. In one or more aspects, the processor and/or system can flush using both concepts, namely only flush if the ratio of finished to pending instructions is less than a threshold, and only flush at the next (first) unfinished instruction or last consecutive finished instruction, after the NTC instruction, preferably on a per thread basis.

Turning to the environments in which the system, product, methods, techniques, and programming instructions have potential application, FIG. 1 illustrates an example computing system 100 configured with a processor 105 and memory subsystem 120, according to an embodiment. As shown, the computing system 100 includes processor 105, network interface 115, memory 120, and storage 130, each connected to bus 117. The computing system 100 may also include an I/O device interface 110 connecting I/O devices 112 (e.g., keyboard, display, and mouse devices) to the computing system 100. Further, in context of the present disclosure, the computing system 100 is representative of a physical computing system, e.g., a desktop computer, laptop computer, tablet, server, etc. Of course, the computing system 100 will include a variety of additional hardware components.

The processor 105 retrieves and executes programming instructions and data stored in memory 120, e.g., main memory, as well as stores and retrieves application data residing in more remote storage 130. The bus 117 is used to transmit instructions and data between the processor 105, I/O device interface 110, network interface 115, memory 120, and storage 130. Memory 120 is generally included to be representative of a memory subsystem (e.g., main memory) and can include caches, interconnects, and random access memory (RAM), e.g., dynamic random access memory (DRAM). Memory 120 stores program instructions and operand data used by the processor 105. Storage 130 may be a combination of fixed and/or removable storage devices, such as fixed disc drives, removable memory cards, or optical storage, network attached storage (NAS), or a storage-area network (SAN).

Figure 2:
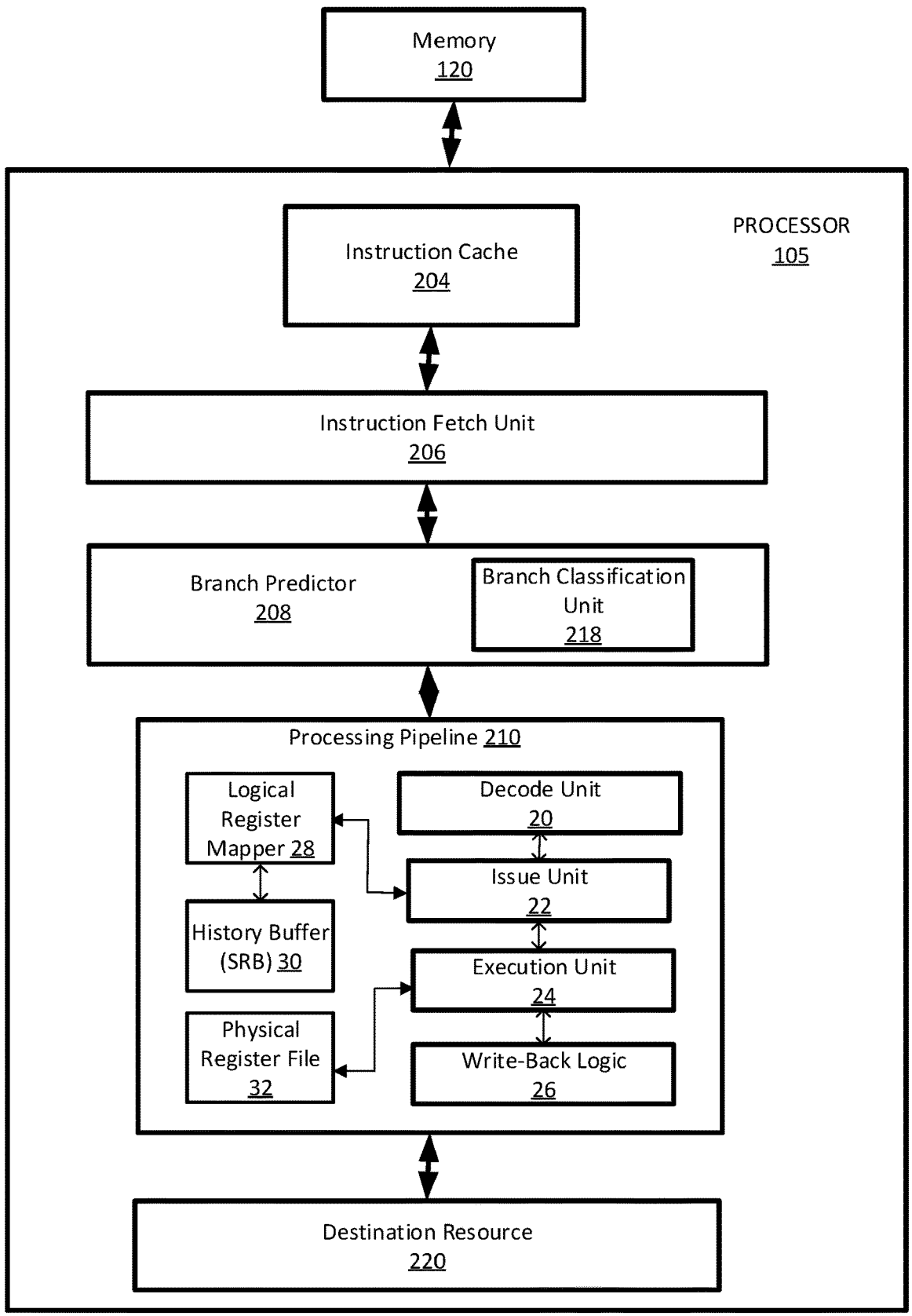
FIG. 2 illustrates portions of a computing system or information handling system according to an embodiment in which certain aspects of the present disclosure may be practiced.

FIG. 2 depicts a block diagram of an information handling system 100 according to an embodiment. The information handling system 100 includes processor 105 and memory 120. The processor 105 includes instruction cache 204, instruction fetch unit 206, branch predictor 208, branch classification unit 218, processing pipeline 210, and destination resource 220. The processor 105 may be included within a processor core or otherwise distributed within a computer system. Instructions and data can be stored in memory 120, and the instruction cache 204 may access instructions in memory 120 and store the instructions to be fetched in instruction cache 204. The memory 120 may include any type of volatile or nonvolatile memory, including cache memory. The memory 120 and instruction cache 204 can include multiple cache levels. A data cache (not shown) may also be included in the processor 105.

In FIG. 2, a simplified example of the instruction fetch unit 206, branch predictor 208, and the processing pipeline 210 are depicted. In various embodiments, the processor 105 may include multiple processing pipelines 210 and instruction fetch units 206. In an embodiment, the processing pipeline 210 includes a decode unit 20, an issue unit 22, an execution unit 24, write-back logic 26, logical register mapper 28, history buffer, e.g., Save & Restore Buffer (SRB) 30 and physical register file 32. The instruction fetch unit 206 and/or the branch predictor 208 may also be part of the processing pipeline 210. The processing pipeline 210 may also include other features, such as error checking and handling logic, one or more parallel paths through the processing pipeline 210, and other features now or hereafter known in the art. While a forward path through the processor 105 is depicted in FIG. 2, other feedback and signaling paths may be included between elements of the processor 105. The processor 105 may include other circuits, functional units, and components.

The instruction fetch unit 206 fetches instructions from the instruction cache 204 according to an instruction address, for further processing by the decode unit 20. The decode unit 20 decodes instructions and passes the decoded instructions, portions of instructions, or other decoded data to the issue unit 22. The decode unit 20 may also detect branch instructions which were not predicted by branch predictor 208. The decode unit 20 may include a dispatch unit that dispatches the instructions to the issue unit 22. The dispatch unit may exist separately from the decode unit 20. The issue unit 22 analyzes the instructions or other data and transmits the decoded instructions, portions of instructions, or other data to one or more execution units 24 in the pipeline 210 based on the analysis. The issue unit 22 typically holds an instruction until data associated with the instruction has been retrieved and ready for use. One or more physical register files 32 may serve to store data to be used in an operation specified in an instruction dispatched to execution unit 22, and the result of the operation performed by the execution units 24 may be written to the physical register 32 using write back logic 26.

The processor typically includes an instruction counter that increments for each instruction in a thread that is dispatched to the issue unit 22. The execution unit 24 executes instructions out of order and when the execution unit 24 finishes an instruction, the execution unit 24 will send the finished instruction, e.g., itag, to an instruction completion table (ICT). There are circumstances when the instructions and corresponding data in the processor pipeline will need to be flushed, or where it will be advantageous to have them flushed.

The write-back logic 26 writes results of instruction execution back to a destination resource 220. The destination resource 220 may be any type of resource, including physical register files, cache memory, other memory, I/O circuitry to communicate with other devices, other processing circuits, or any other type of destination for executed instructions or data.

Instructions may be processed in the processor 105 in a sequence of logical, pipelined stages. However, it should be understood that the functions of these stages may be merged together so that this particular division of stages should not be taken as a limitation, unless such a limitation is clearly indicated in the claims herein. Indeed, some of the stages are indicated as a single logic unit in FIG. 2 for the sake of simplicity of understanding, and further detail as relevant will be provided below.

In certain aspects, a processor 105, also referred to as a central processing unit (CPU) or micro-processor, may have multiple execution/processing slices with each slice having one or more of the units shown in FIG. 2. For example, in FIG. 3, processor 105 has four processing slices S0:S3, where each processing slice may have its own processing pipeline with history buffer (SRB) 30, issue unit or issue queue (ISQ) 22, and functional/execution units 24. Two slices may form a super slice, e.g., slice 0 (S0) and slice 1 (S1) form superslice 0 (SS0), and slice 2 (S2) and slice 3 (S3) forms superslice 1 (SS1). A processor (CPU) 105 having multiple processing slices may be capable of executing multiple instructions simultaneously, for example, one instruction in each processing slice simultaneously in one processing cycle. Such a processor (CPU) having multiple processing slices may be referred to as a multi-slice processor or a parallel-slice processor. In an example, each processing slice may be an independent processor (e.g., processor 105) and may execute instructions independently of other processing slices in the multi-slice processor, so that multiple threads can be simultaneously executed by the multi-slice processor. Simultaneous processing in multiple slices may considerably increase processing speed of the multi-slice processor.

Figure 3:
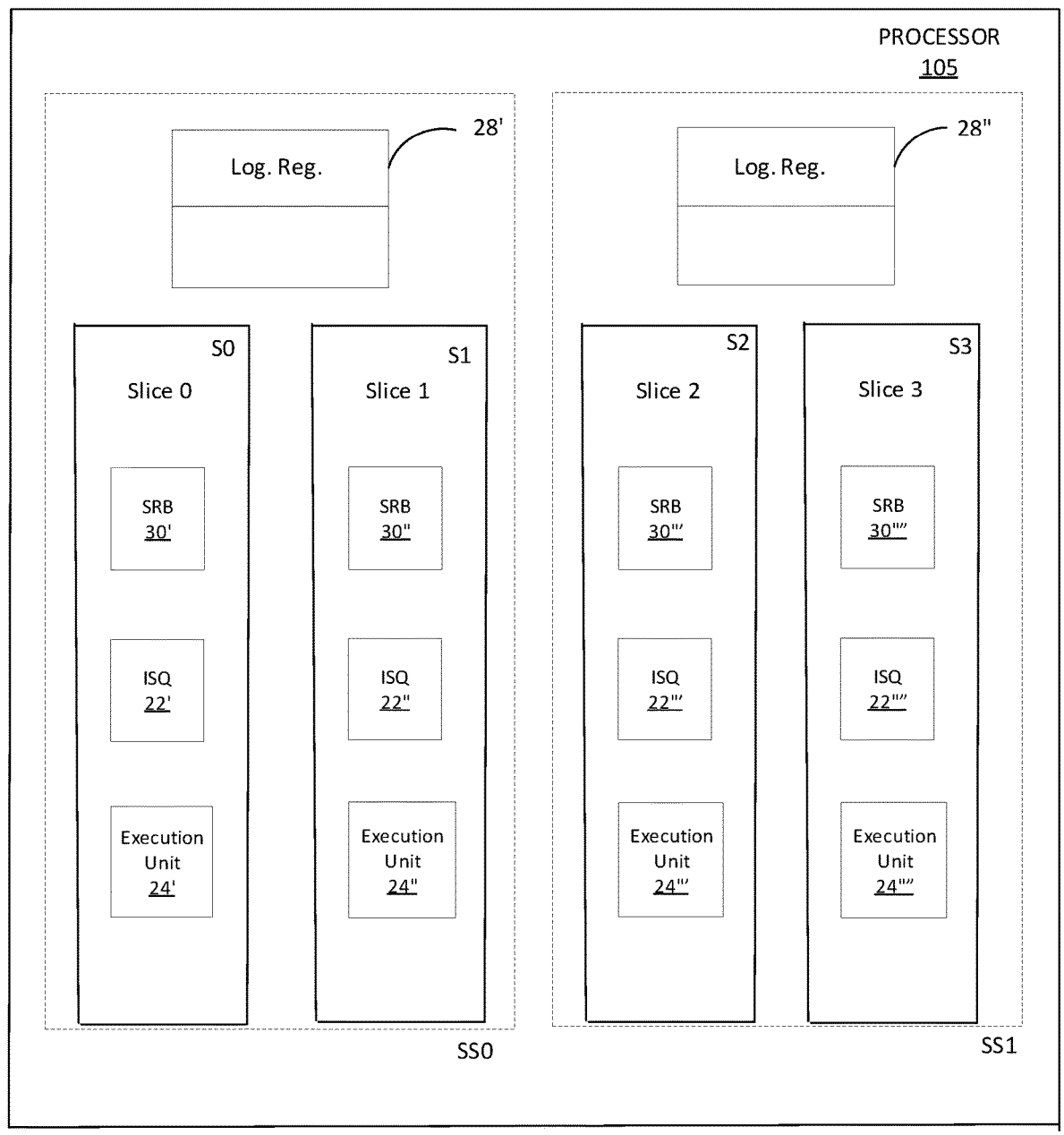
FIG. 3 illustrates a block diagram of a multi-slice processor in accordance with an embodiment in which certain aspects of the present disclosure may be practiced.

Multi-slice processor 105 in FIG. 3 can operate and handle one or more threads of instructions simultaneously. In single-thread (ST) mode a single thread is processed, and in SMT mode, two threads (SMT2) or four threads (SMT4) are simultaneously processed. The System Management Controller (SMC) partitions the slices S0:S3 according to the mode of operation, i.e., single thread (ST) mode, simultaneous two-thread mode (SMT2), or simultaneous four-thread mode (SMT4). The logical register mappers 28',28" keep in sync across the superslices and see all dispatches and recoveries from both superslices.

Figure 4:
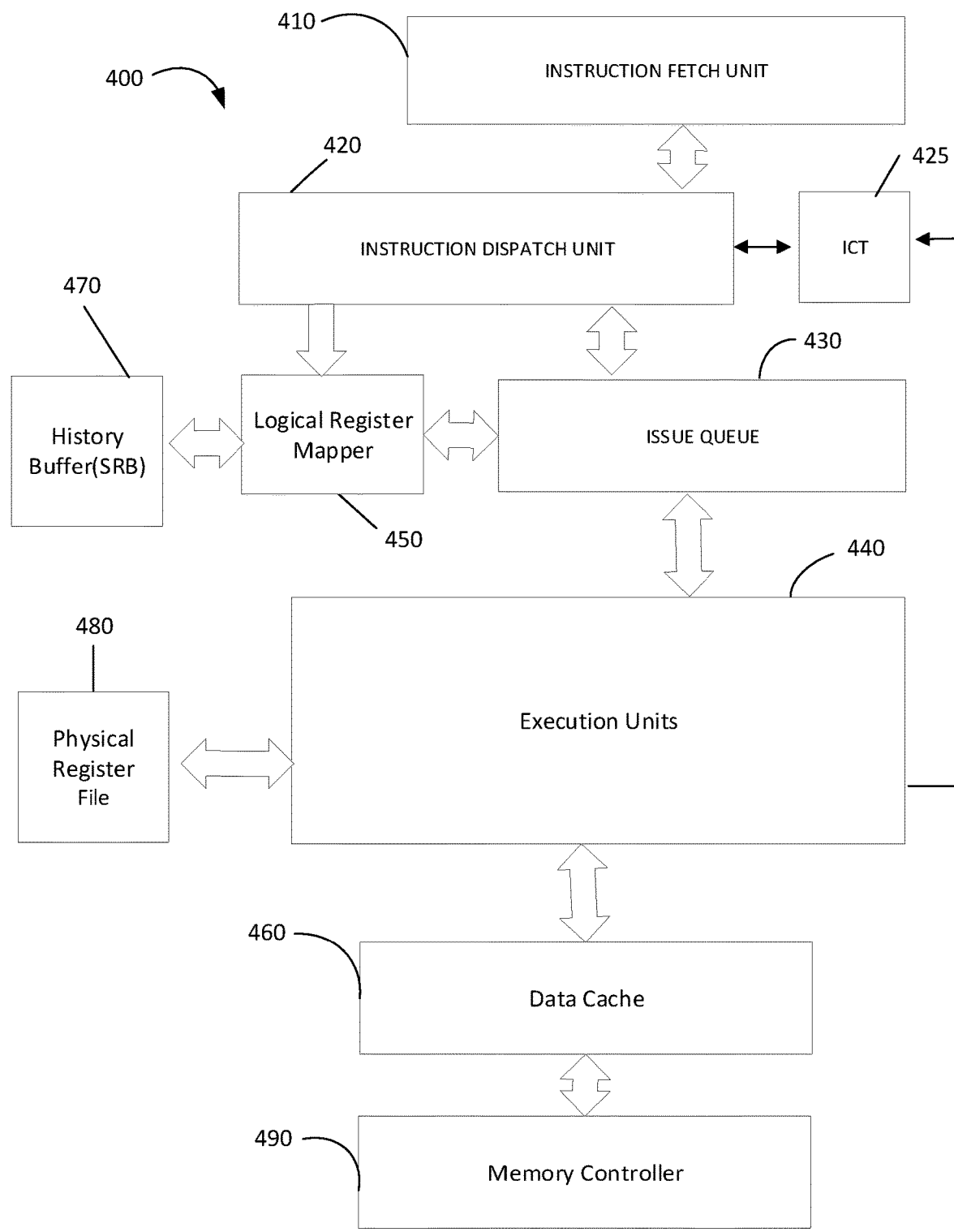
FIG. 4 illustrates portions of an embodiment of a processor pipeline in which certain aspects of the present disclosure may be practiced.

FIG. 4 illustrates a block diagram of a portion of a pipeline 400 of processor 105. The pipeline 400 in the processor 105 in FIG. 4 includes Instruction Fetch Unit 410, Instruction Dispatch Unit 420, Instruction Completion Table (ICT) 425, Issue Queue (ISQ) 430, Execution Units 440, Logical Register Mapper 450, Data Cache 460, history buffer (SRB) 470, Physical Register File 480, and Memory Controller 490. The Execution Units 440 may each include one or more queues to hold instructions for execution by the Execution Units 440.

The Instruction Fetch Unit 410 fetches instructions to be executed by the processor 105 or processor slice and sends them to the Instruction Dispatch Unit 420. The Instruction Dispatch Unit 420 dispatches instructions to the Issue Queue (ISQ) 430, typically in program order. Dispatch Unit 420 will stamp each instruction dispatched to the Issue Queue 430 with an identifier, e.g., identification tag (itag), to identify the instruction. The Dispatch Unit 420 may stamp instructions with other information and meta data. The instructions (itags) are allocated (assigned) and stamped in ascending program order on a per thread basis typically by the Dispatch Unit 420. The processor and/or Dispatch Unit 420 typically has a per thread instruction counter that increments for each instruction in a thread that is dispatched to the Issue Queue 430. The Issue Queue (ISQ) 430 will issue instructions to the appropriate Execution Unit 440. The ISQ 430 typically holds an instruction until data associated with the instruction has been retrieved and ready for use in the Data Cache 460.

If the data is not available in the Data Cache 460, e.g., there is a miss, the Memory Controller 490 will fetch the data from the memory subsystem, e.g., memory subsystem 120. A physical register file 480 may serve to store data to be used in an operation specified in an instruction dispatched to an execution unit 440, and the result of the operation performed by the Execution Units 440 may be written to the designated target register entry in the physical register file 480. Logical register mapper 450 contains meta data (e.g., itag, RFtag, etc.) which provides a mapping between entries in the logical register (e.g., GPR1) and entries in physical register file 460 (e.g., physical register array entry). The RFtag is a pointer that correlates a logical register entry to a physical register file entry. For example, when an instruction wants to read a logical register, e.g., GPR1, the logical register mapper 450 tells issue queue 430, which tells execution unit 440 where in the physical register file 480 it can find the data, e.g., the physical register array entry.

When data is not ready, e.g., not within the appropriate data cache or register, delay can result as the ISQ 430 will not issue the instruction to the Execution Unit 440. For at least this reason, the Issue Queue (ISQ) typically issues instructions to the Execution Units 440 out of order so instructions where the required data is available can be executed. The Execution Unit 440 executes instructions out of order and when the Execution Unit 440 finishes an instruction, the Execution Unit 440 will send the finished instruction, e.g., itag, to the Instruction Complete Table (ICT) 425. The ICT 425 contains a queue of the instructions dispatched by the Dispatch Unit 420 and tracks the progress of the instructions as they are processed. In an embodiment, the ICT 425 has a completion tail pointer that keeps track of the progress of executing instructions in the thread, e.g., points to the next to complete (NTC) instruction. The instruction entry in the ICT 425 will not identify the instruction as complete until all older instructions in the thread are completed.

There are circumstances when the instructions and corresponding data in the processor pipeline and/or memory will need to be flushed, e.g., a branch misprediction, and in circumstances where it will be advantageous to flush instructions and corresponding data, e.g., a balance flush to free up processor resources to process other threads being processed by the processor. For example, where a thread misses in the L3 cache or a translation lookaside buffer (TLB), it might be advantageous to flush and restore the instructions and associated data in the processor pipeline and/or memory subsystems. The processor may include a history buffer, e.g., Save & Restore Buffer (SRB) 470, to save a processor state before, for example, an interruptible instruction, so that if an interrupt occurs, control logic may recover the processor state by restoring the content of registers, memory cache, and main memory. In an aspect, flush recovery to logical registers can be performed through logical register mappers 450 typically by slice from history buffers, e.g., SRBs 470. Logical register entries can be restored after a flush from the history buffer (SRB) 470 by updating the RFtag pointers so instructions know where to get the correct data. During a flush operation, history buffer (SRB) entries to be recovered are typically read from the history buffer (SRB) and written to the logical register mapper 450. The specific manner of performing the flush and restore operations are beyond the pertinent aspects of this disclosure.

Figure 5:
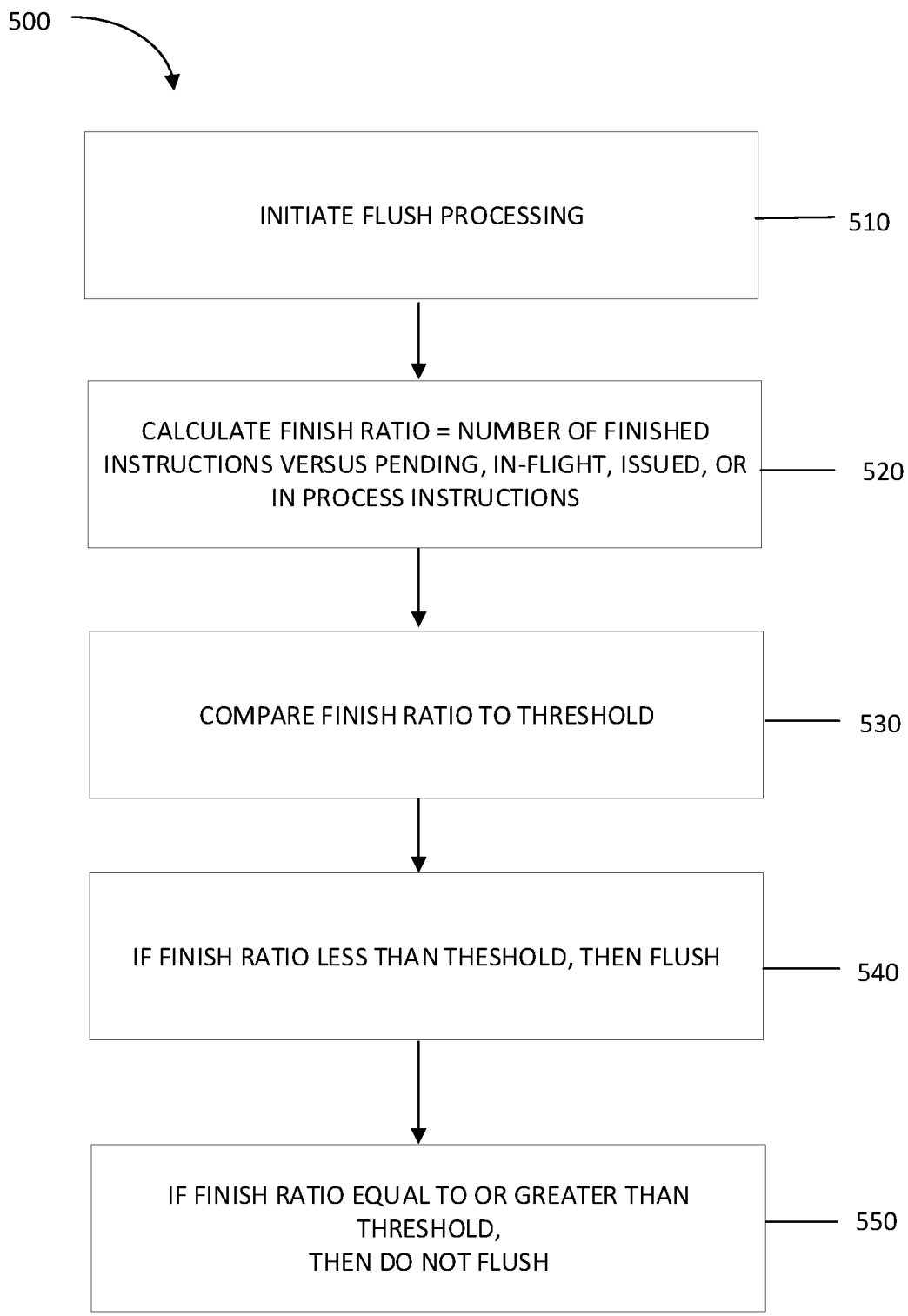
FIG. 5 illustrates a flow diagram of an embodiment of a method to flush a processor.

FIG. 5 is an exemplary flowchart in accordance with one embodiment illustrating and describing a process, technique, or method 500 of handling instructions in an information handling system, and more specifically a method of reducing a number of flushing operations in a processor. In an aspect a method 500 of more intelligently flushing a processor is disclosed. While the method 500 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 5, but the process may be integrated and/or one or more steps may be performed together, simultaneously, or the steps may be performed in the order disclosed or in an alternate order.

At 510, a flushing operation is triggered. The criteria for triggering the flushing operation could be based upon numerous criteria. In one example, a balance flushing operation could be triggered, for example as a result of a L3 Cache or translation lookaside buffer (TLB) miss. Generally, in an example, the dispatch unit stalls dispatching instructions for a number of cycles, and the processor finds threads that have a L3 cache or TLB miss. Depending upon the flush rules, one thread or all threads having the L3 and/or TLB miss are flushed. Typically after flushing, decoding does not have to be performed again, rather a hold is placed on the load buffer that is released when the miss is resolved. While the method 500 will be described primarily in the context of balanced flushing, other flushing operations are contemplated, and other criteria for triggering a flush operation, including a balanced flush operation, are contemplated.

At 520 a finish ratio is calculated. The finish ratio, depending upon what type of flush operation and the criteria used to determine whether to proceed with the flush operation, is the number of finished instructions to the number of pending, in-flight, issued, and/or in-process instructions. In one or more embodiments, the information to calculate the ratio is obtained (read) from an ICT, a global completion table (GCT), and/or a reorder buffer (ROB), depending upon the processor architecture. In one or more embodiments, the information obtained from the ICT, GCT, and/or the ROB includes the number of instructions that are finished and the number of instructions that are pending, in-flight, issued, and/or being processed, and in an aspect the numbers are obtained on a per thread basis. For example, from the ICT, the number of finished and the number of pending instructions on a per thread basis are obtained. Once the information is obtained, the finish ratio is calculated. The circuitry and logic to calculate the ratio in one or more aspects can reside in the ICT, GCT, ROB, ISQ, or the Dispatch Unit.

At 530 the finish ratio is compared to a threshold ("T"). The threshold can be predetermined, programmable, fixed, and/or variable, and can be determined based upon a number of criteria. For example, the threshold could be ninety percent (90%), or eighty percent (80%), or some other percentage. It is contemplated that the threshold is determined in a manner that will provide processing efficiency by considering when enough instructions have been finished whereby it would be inefficient to flush the pipeline and remove a number of instructions that are finished. For example, in a processor undergoing multithreading processing, a stall of one of the threads of instructions can stall operations on the other threads of instructions. So for example, if one of the threads has a L3 or TLB miss, a balance flush can be performed to free up resources while the data or translation is being obtained from memory. If the ratio of instructions that are finished versus the number of instructions that are pending, in-flight, issued, and/or being processed is high, in other words above a threshold, then flushing the instructions in the processor pipeline could be inefficient. The reason that not flushing would work in this scenario is because work has been performed and balance flushing will erase a lot of the work that would have to be performed again. So in this instance it might be better to forgo the flush operation so the work does not have to be performed again, which could increase the processor efficiency over the situation where the flush is performed.

At 540, if the finish ratio is less than (or in an aspect less than or equal to) the threshold ("T"), the flushing operation is performed. So in the example of balance flushing, the instructions after the NTC instruction are flushed, and in an aspect are flushed on a per thread basis. In this regard, the instructions and data associated with the flushed instructions are flushed, and the processor recovers to the appropriate state. On the other hand, at 550, if the instructions that are finished is equal to or greater than (or in an aspect only greater than) the threshold, then the instructions and data in the processor are not flushed.

This disclosure proposes in an embodiment a system, product, programming instructions, technique, and/or method to reduce the number of flush operations. In a specific example, the finish ratio of number of finished instructions on a per thread basis to the number of pending (in-flight, issued, and/or processed) instructions on a per thread basis is calculated, and if the finish ratio is greater than (or equal to and greater than) a threshold, then the flushing operation, e.g., the flushing operation is not performed, but if the finish ratio is less than or equal to (or less than) the threshold, then the flushing operation, e.g., the balanced flushing operation is performed. As an example, if the threshold for no flushing operation is set at ninety percent (90%), and a balance flushing operation criteria is met, and the balance flushing operation is triggered, the ICT is reviewed to obtain the number of finished instructions and the number of pending instructions in the ICT. In an example, the ICT has 90 instructions of which 85 are finished, the ICT is reviewed and the finish ratio is calculated (85/90) to be ninety-four percent (94%) which is above the threshold of ninety percent (90%), so no balanced flushing operation is performed.

Figure 6:
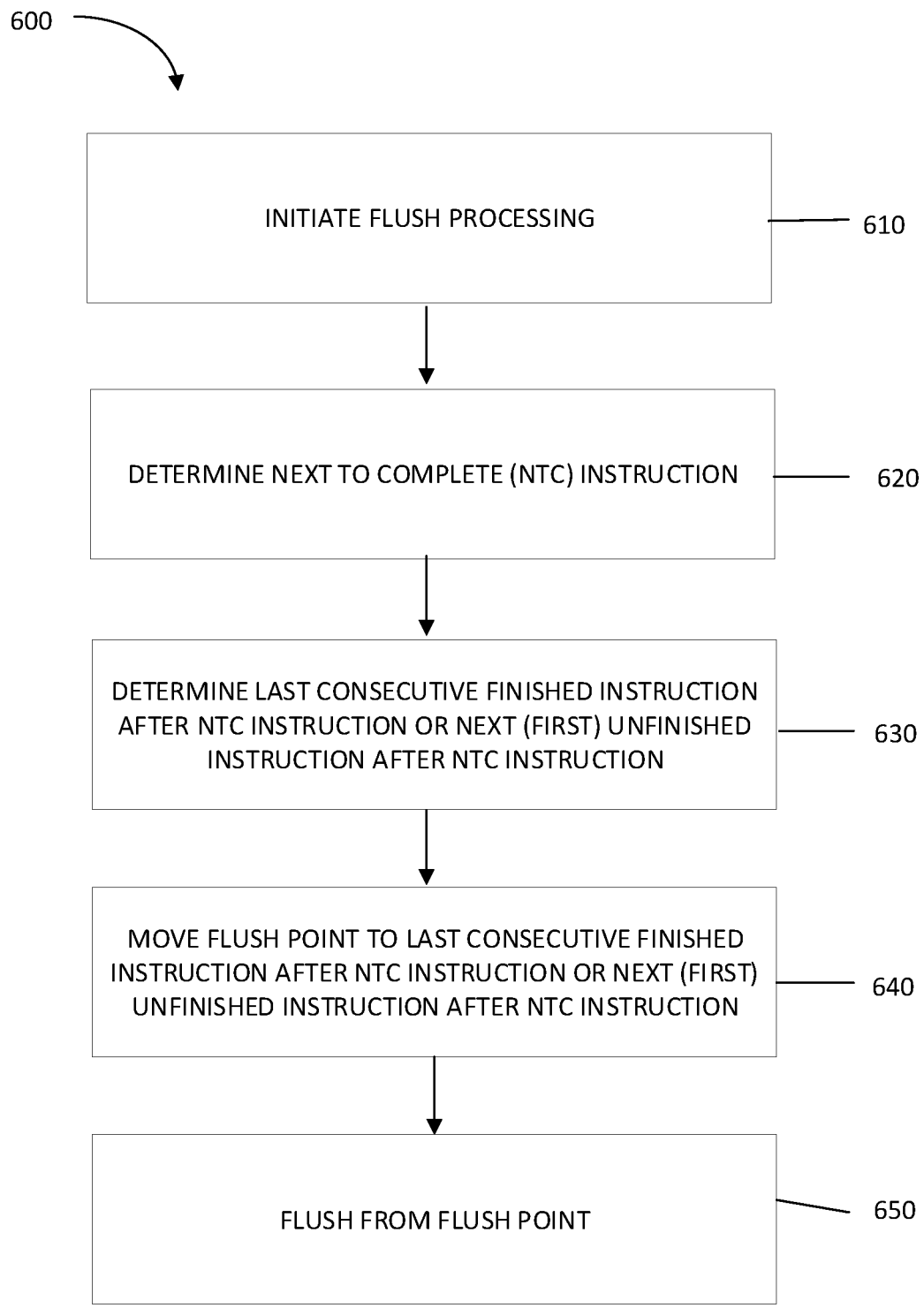
FIG. 6 illustrates a flow diagram of another embodiment of a method to flush a processor.

FIG. 6 is an exemplary flowchart in accordance with one embodiment illustrating and describing a process, technique, or method 600 of handling instructions in an information handling system, and more specifically a method of moving the flush point of flushing operations in a processor to preserve and not eliminate instructions that are finished. In an aspect a method 600 of more intelligently flushing a processor is disclosed. While the method 600 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 6, but the process may be integrated and/or one or more steps may be performed together, simultaneously, or the steps may be performed in the order disclosed or in an alternate order.

At 610, a flushing operation is triggered. The criteria for triggering the flushing operation could be based upon numerous criteria. In one example, a balance flushing operation could be triggered, for example as a result of a L3 Cache or translation lookaside buffer (TLB) miss. While the method 600 will be described primarily in the context of balanced flushing, other flushing operations are contemplated, and other criteria for triggering a flush operation, including a balanced flush operation, are contemplated.

At 620, the NTC instruction is typically determined. At 630, the youngest operation after the NTC instruction, the next (first) instruction not to finish after the NTC instruction, or the last consecutive finished instruction after the NTC instruction is determined. The flush point at 640 is moved to the youngest finished instruction after the NTC instruction, the next (first) instruction not to finish after the NTC instruction, or the last consecutive finished instruction after the NTC instruction. At 650, the processor is flushed from the flush point, e.g., the youngest finished operation after the NTC instruction, the next (first) not to finish instruction after the NTC instruction, or the last consecutive finished instruction after the NTC instruction. In an example, the next (first) instruction after the NTC instruction that is not finished is determined, the flush point is moved to the next (first) instruction in the processor after the NTC instruction, and processor is flushed from that point, e.g., from the next (first) instruction after the NTC instruction that is not finished. In another example, the last consecutive finished instruction after NTC instruction is determined, and the flush point is moved to the last consecutive finished instruction in the processor after the NTC instruction, and the processor is flushed from that point, e.g., from the last consecutive finished instruction after the NTC instruction.

The disclosure also proposes in another embodiment a system, product, programming instructions, technique, and/or method to move the flushing point in a processor. In one or more embodiments, the flush point is moved to the last instruction after the NTC that is not finished, instead of the NTC plus one instruction as is typical in flushing operations in a processor. In an embodiment, the state of the NTC instruction is ignored (e.g., whether or not the instruction has completed or not is not considered) and the flush point is moved to the last youngest finished instruction in consecutive order. Table 1 below represents the status or state of instructions in an ICT, where on instruction 2 there is a miss in an L3 cache on a load instruction and a balance flush has been triggered in the processor.

TABLE 1

Moving Flush Point Example

| Instruction ID | State of instruction | Notes |
| --- | --- | --- |
| 1 | Completed | |
| 2 | L3 miss on this Load | This is NTC |
| 3 | Finished | Would be Flush Point in typical balance flush operation (NTC + 1) |
| 4 | Finished | |
| 5 | Still in issue queue | Move Flush Point to here |
| 6 | Finished | |

Instead of flushing at the instruction after the NTC (NTC plus 1) instruction, the flush point would move to instruction 5 since there are two consecutive instructions that finished after the NTC instruction before a non-finished instruction. That is the flush point is moved to instruction 5, the first non-finished instruction in the ICT after the NTC instruction, and the system does not flush instructions 3 and 4 that were finished. In this manner, the work performed to finish instructions 3 and 4 is preserved.

Figure 7:
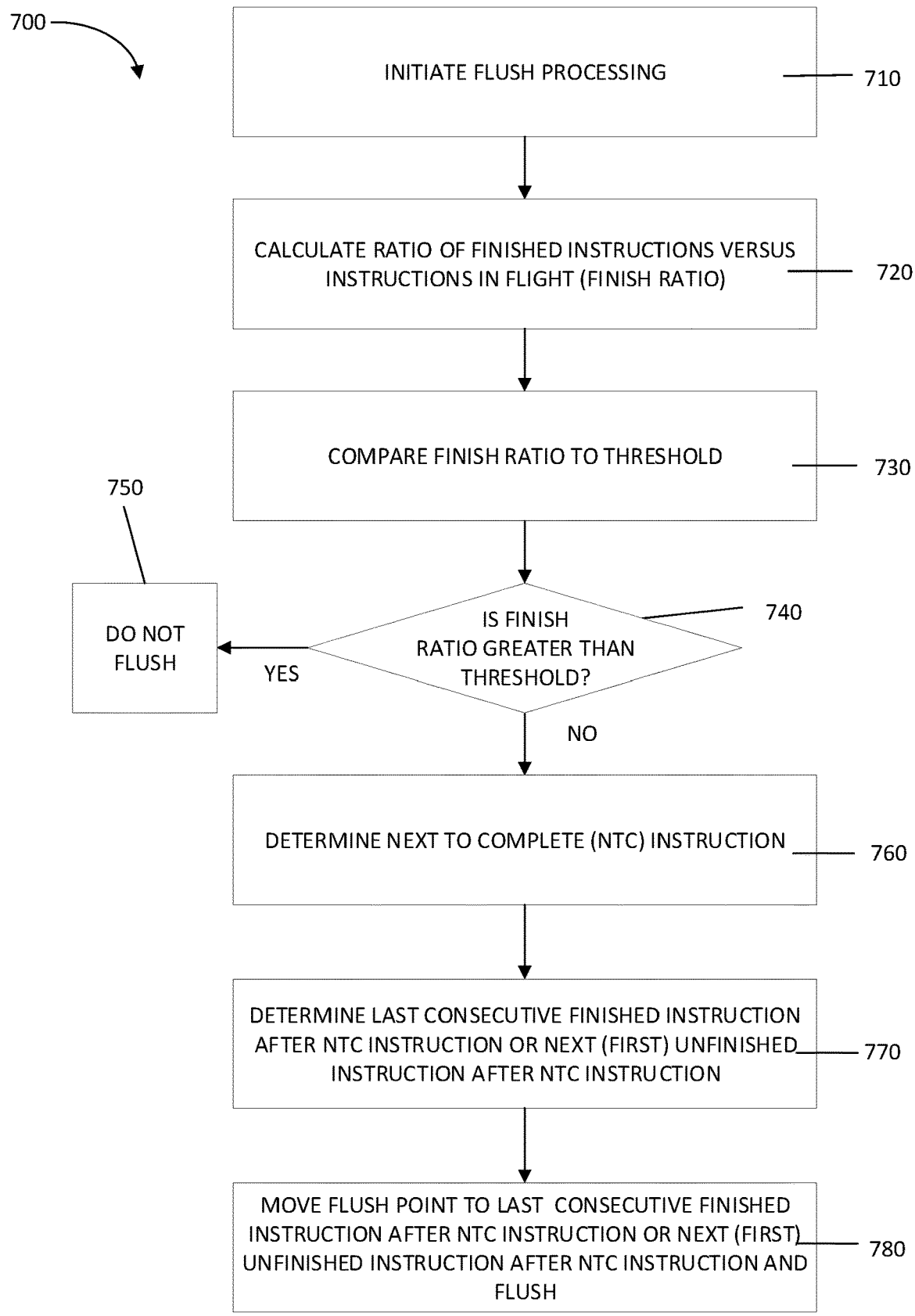
FIG. 7 illustrates a flow diagram of a further embodiment of a method to flush a processor.

FIG. 7 is an exemplary flowchart in accordance with one embodiment illustrating and describing a process, technique, or method 700 of handling instructions in an information handling system, and more specifically a method of reducing a number of flushing operations and moving a flush point in a processor. In an aspect a method 700 of more intelligently flushing a processor is disclosed. While the method 700 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 7, but the process may be integrated and/or one or more steps may be performed together, simultaneously, or the steps may be performed in the order disclosed or in an alternate order.

At 710, a flushing operation is triggered. The criteria for triggering the flushing operation could be based upon numerous criteria. In one example, a balance flushing operation could be triggered, for example as a result of a L3 Cache or translation lookaside buffer (TLB) miss. While the method 700 will be described primarily in the context of balanced flushing, other flushing operations are contemplated, and other criteria for triggering a flush operation, including a balanced flush operation, are contemplated.

At 720, calculate the finish ratio, which is the number of finished instructions versus the number of in-flight, pending, issued, and/or processed instructions, and in an aspect on a per thread basis, although it could be performed on a total number of instructions basis. At 730, the finished ratio is compared to a threshold ("T"), where the threshold can be fixed, variable, programmable and/or predetermined. At 740 it is determined whether the finish ratio is greater than (or equal to and greater than) the threshold ("T"), and if at 740 the finish ratio is greater than (or equal to and greater than) the threshold ("T") (740: Yes), then at 750 no flushing operation is performed.

If at 740, the finish ratio is not greater, i.e., is equal to or less, than the threshold (740: No), then at 760 the NTC instruction is determined in an embodiment. At 770, the youngest instruction after the NTC instruction is determined. At 780, the flush point is moved to the youngest finished operation after the NTC instruction, and the processor pipeline is flushed. The youngest finished operation after the NTC instruction is in an embodiment determined on a per thread basis and the processor pipeline in an embodiment is flushed on a per thread basis. In an embodiment, at 770 the next instruction not to finish after the NTC instruction is determined, and at 780 the flush point is moved to the next instruction not to finish after the NTC instruction, and the processor pipeline is flushed from that point. In an embodiment, at 770 the last consecutive finished instruction after the NTC instruction is determined, and at 780 the flush point is moved to the last consecutive finished instruction after the NTC instruction, and the processor pipeline is flushed from that point. In an aspect the calculation and determining step is done on a per thread basis, as is the moving of the flush point and the flushing operation. The method 700 has particular application to when a balance flush operation has been triggered and the performance of a balance flush operation.

The disclosure also proposes in another embodiment a system, product, programming instructions, technique, and/or method to move the flushing point in a processor. In one or more embodiments, the flush point is moved to the first unfinished instruction where the finish ratio of the instructions is above a threshold (instead of the NTC plus one instruction being the flush point as is typical in flushing operations in a processor). In an embodiment, the state of the NTC instruction is ignored (whether or not the instruction has completed or not is not considered) and the flush point is moved to the last youngest finished instruction in consecutive order. In an aspect, the flush point is moved to the next (first) unfinished instruction after the NTC instruction.

Figure 8:
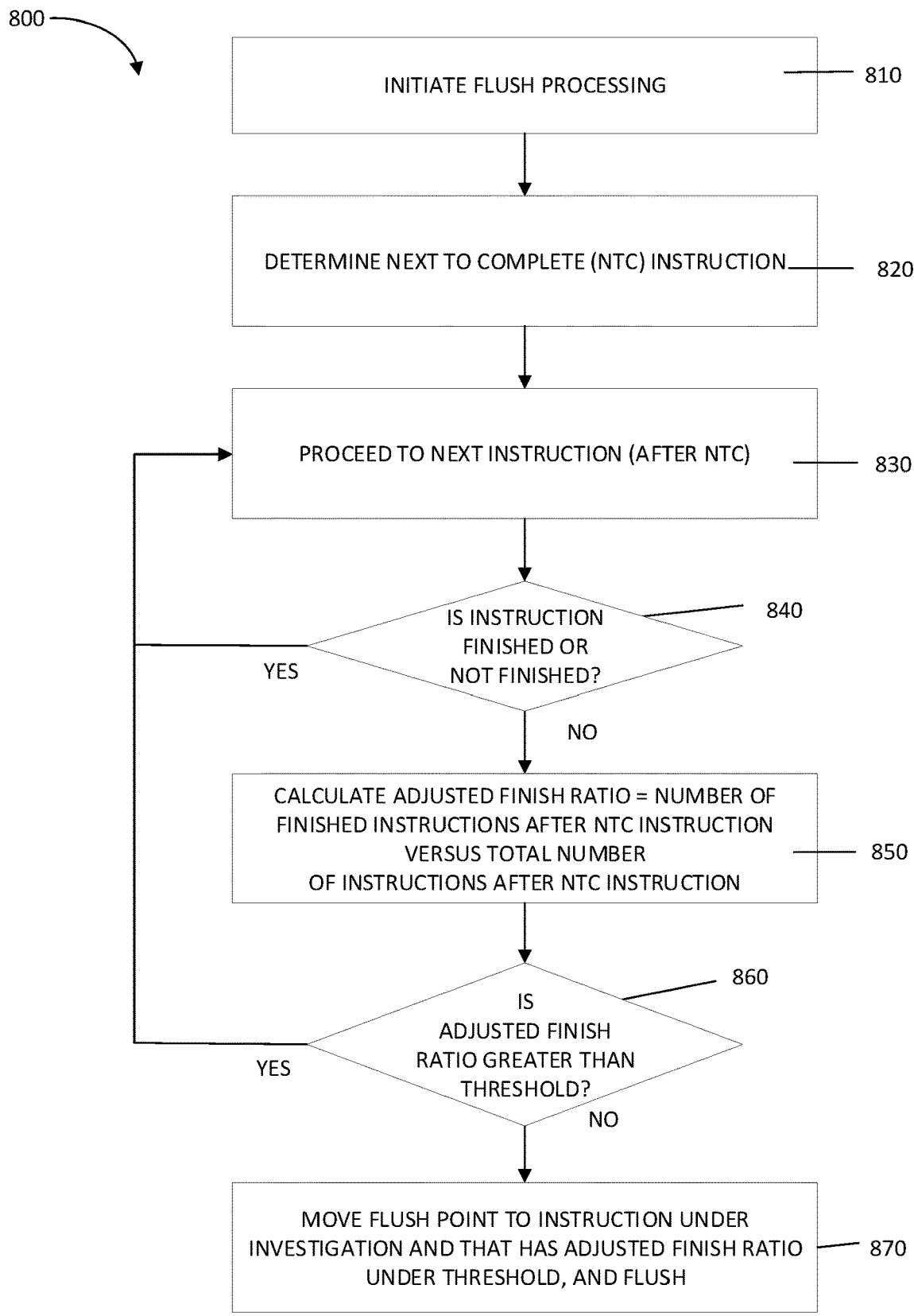
FIG. 8 illustrates a flow diagram of a further embodiment of a method to flush a processor.

FIG. 8 is an exemplary flowchart in accordance with another embodiment illustrating and describing a process, technique, or method 800 of handling instructions in an information handling system, and more specifically a method of moving a flush point in a processor and/or or reducing a number of flushing operations. In an aspect a method 800 of more intelligently flushing a processor is disclosed. While the method 800 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 8, but the process may be integrated and/or one or more steps may be performed together, simultaneously, or the steps may be performed in the order disclosed or in an alternate order.

At 810, a flushing operation is triggered. The criteria for triggering the flushing operation could be based upon numerous criteria. In one example, a balance flushing operation could be triggered, for example as a result of a L3 Cache or translation lookaside buffer (TLB) miss. While the method 800 will be described primarily in the context of balanced flushing, other flushing operations are contemplated, and other criteria for triggering a flush operation, including a balanced flush operation, are contemplated.

At 820 determine the next to complete (NTC) instruction. At 830, proceed to the next instruction, for example in the ICT, GCT, ROB, ISQ, or Dispatch Unit, and at 840 determine whether or not that next instruction is finished or not finished. If at 840 the instruction is finished (840: Yes), then continue to 830 where the process 800 continues to the next instruction, for example in the ICT, GCT, ROB, ISQ, or the Dispatch unit. If at 840, the next instruction is not finished (840: No), then proceed to 850. In other words, in response to a flush process being initiated, determine the NTC, and then proceed until the next unfinished instruction. At 850 determine the adjusted finish ratio. The adjusted finish ratio is the number of finished instructions after the NTC instruction versus (divided by) the total number of instructions after the NTC instruction. At 860 determine whether or not the adjusted finish ratio is greater than a threshold ("T"). The threshold can be predetermined, programmable, fixed, and/or variable, and can be determined based upon a number of criteria. For example, the threshold could be ninety percent (90%), or eighty percent (80%), or some other percentage. It is contemplated that the threshold is determined in a manner that will provide processing efficiency.

If at 860 the adjusted finish ratio is greater than the threshold (860: Yes), then the process continues back to 830 where the process 800 continues to the next instruction, and follows the sequence of 840 through 860. If at 860 the adjusted finish ratio is not greater than, i.e., is equal to or less than, the threshold (860: No), then the process continues to 870 where the flush point is moved to the instruction being investigated at 860, and the processor pipeline is flushed from the flush point.

The disclosure also proposes in another embodiment a system, product, programming instructions, technique, and/or method to move the flushing point in a processor. In one or more embodiments, the flush point is moved to the first unfinished instruction after the NTC instruction where the adjusted finish ratio is below a threshold. Table 2 below represents the status or state of instructions in an ICT, where on instruction 2 there is a miss in an L3 cache on a load instruction and a balance flush has been triggered in the processor.

TABLE 2

Example of Intelligent Flush Processing

| Instruction ID | State of instruction | Notes |
|---|---|---|
| 1 | Completed | |
| 2 | L3 miss on this Load | NTC |
| 3 | Finished | Would be Flush Point in typical Balance Flush operation |
| 4 | Finished | |
| 5 | Still in issue queue | Adjusted Finish Threshold >= 2/3 |

TABLE 2-continued

Example of Intelligent Flush Processing

| Instruction ID | State of instruction | Notes |
|---|---|---|
| 6 | Finished | |
| 7 | Still in issue queue | Move Flush Point to here |

In the example of Table 2, some of the non-finished instructions are not flushed. The example of Table 2 follows the method 800 where the threshold is set at sixty percent (60%). In response to a trigger to initiate a balance flush, for example instruction 2, where there is an L3 cache miss on a load instruction, instead of flushing at the instruction after the NTC (NTC plus 1) instruction (instruction 3), the flush point would move to instruction 7.

More specifically, in the example of Table 2, after a balance flush operation is triggered the NTC instruction is determined and the process moves to the next instruction (instruction 3) in the ITC which is a finish instruction, so the instruction moves to the next instruction (instruction 4) in the ITC which is a finished instruction so the process moves to the next instruction (instruction 5). Instruction 5 is an unfinished instruction that is still in the issue queue (ISQ) so the adjusted finish ratio is calculated for instruction 5. The adjusted finish ratio is the number of finished instructions after the NTC instruction versus (divided by) the total number of instructions after the NTC instruction. At instruction 5 the adjusted finish ratio is 2/3 or 66.66% (2 finished instructions after the NTC instruction divided by three (3) instructions after NTC instruction), which is greater than sixty percent (60%) so the process proceeds to the next instruction (instruction 6) in the ITC. The instruction 6 is a finished instruction so the process moves to the next instruction in the ITC, instruction 7. Instruction 7 is an unfinished instruction as it is still in the issue queue so the adjusted finish ratio is calculated and compared to the threshold. The adjusted finish ratio for instruction 7 is calculated (three (3) finished instructions after NTC instruction divided by a total of five (5) instructions after NTC) for 3/5 or sixty percent (60%) which is not greater than the threshold, so the flush point is moved to instruction 7.

In the preceding, reference is made to embodiments presented in this disclosure. However, the scope of the present disclosure is not limited to specific described embodiments. Instead, any combination of the following features and elements, whether related to different embodiments or not, is contemplated to implement and practice various embodiments.

Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim (s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments presented herein may be devised without departing from the basic scope thereof, and the scope thereof is determined by the claims that follow.

What is claimed is:

1. A method of processing data in an information handling system, comprising:
    in response to an event that triggers a flushing operation, calculate a finish ratio, wherein the finish ratio is a number of finished operations to a number of at least one of a group consisting of in-flight instructions, instructions pending in a processor pipeline, instructions issued to an issue queue, and instructions being processed in a processor execution unit;
    compare the calculated finish ratio to a threshold;
    if the finish ratio is greater than the threshold, then do not perform the flushing operation; and
    if the finish ratio is not greater than the threshold, then perform the flushing operation.

2. The method of claim 1, wherein the event triggers a balance flushing operation, and if the finish ratio is greater than the threshold, then do not perform the balance flushing operation, and if the finish ratio is not greater than the threshold, then perform the balance flushing operation.

3. The method of claim 1, wherein the threshold is at least one of a group consisting of a fixed threshold, a predetermined threshold, a variable threshold, and a programmable threshold.

4. The method of claim 1, wherein the threshold is set at a fixed ninety percent or greater.

5. The method of claim 1, wherein the finish ratio is calculated on a per thread basis.

6. The method of claim 1, wherein the finish ratio is based upon the number of finished instructions in at least one of a group consisting of an Instruction Completion Table, a Global Completion Table, and a reorder buffer.

7. The method of claim 1, wherein the finish ratio is calculated based upon the number of instructions finished in a thread in an instruction completion table divided by the total number of instructions in the instruction completion table.

8. The method of claim 1, further comprising:
    in response to the finish ratio not being greater than the threshold, move a flush point to a point other than the instruction after a next to complete instruction, wherein the flush point identifies the instruction from which younger instructions in the information handling system are flushed.

9. The method of claim 8, further comprising moving the flush point to one of a group consisting of a next unfinished instruction after the next to complete instruction and a last consecutive finished instruction after the next to complete instruction.

10. A method of processing data in an information handling system, comprising:
    in response to an event that triggers a flushing operation, determine a next to complete (NTC) instruction;
    determine one of either a first unfinished instruction after the NTC instruction or a last consecutive finished instruction after the NTC instruction; and
    move a flush point to a respective one of either the first unfinished instruction after the NTC instruction or the last consecutive finished instruction after the NTC instruction, wherein the flush point identifies the instruction from which younger instructions in the information handling system are flushed;
    before performing a flushing operation, calculate a finish ratio, wherein the finish ratio is a number of finished operations to a number of at least one of a group consisting of in-flight instructions, instructions pending in a processor pipeline, instructions issued to an issue queue, and instructions being processed in a processor execution unit;

compare the calculated finish ratio to a threshold;

if the finish ratio is greater than the threshold, then do not perform the flushing operations; and if the finish ratio is equal to or less than the threshold, then perform the flushing operation.

11. The method of claim 10, further comprising:

determine a next unfinished instruction in an instruction completion table after the NTC instruction and calculate an adjusted finish ratio, wherein the adjusted finish ratio for an unfinished instruction is the number of finished instructions after the NTC instruction in the instruction completion table before that unfinished instruction divided by the number of instructions after the NTC instruction in the instruction completion table;

determine whether the adjusted finish ratio for that next unfinished instruction in the instruction completion table is greater than the threshold; and if the adjusted finish ratio is not greater than the threshold, move the flush point in the instruction completion table to an unfinished instruction whose adjusted finish ratio is not greater than the threshold.

12. The method of claim 11, further comprising:

if the adjusted finish ratio is greater than the threshold, do not move the flush point to that unfinished instruction and proceed to the next unfinished instruction;

determine whether the adjusted finish ratio for that next unfinished instruction in the instruction completion table is greater than a threshold; and if the adjusted finish ratio is not greater than the threshold, move the flush point in the instruction completion table to the unfinished instruction whose adjusted finish ratio is not greater than the threshold.

13. The method of claim 10, wherein the event triggers a balance flushing operation.

14. The method of claim 11, wherein the threshold is at least one of a group consisting of a fixed threshold, a predetermined threshold, a variable threshold, and a programmable threshold.

15. The method of claim 11, wherein the threshold is set at a fixed sixty percent or greater.

16. The method of claim 11, wherein the adjusted finish ratio is calculated on a per thread basis.

17. An information handling system, comprising:

a processor having a processor pipeline comprising:

an issue queue for holding instructions until data is local to the processor;

one or more execution units for executing instructions received from the issue queue; and an instruction completion table having a plurality of entries for tracking instructions that are pending and instructions that are finished and not complete in the processor, wherein the processor is configured to issue instructions to the one or more execution units out of order and the instructions are marked as complete in order; and further wherein the processor is configured to:

in response to an event that triggers a flushing operation, calculate a finish ratio, wherein the finish ratio is a number of instructions marked as finished in the instruction completion table to a number of instructions in the instruction completion table;

compare the calculated finish ratio to a threshold; and if the finish ratio is greater than the threshold, then do not perform the flushing operation.

18. The system of claim 17, wherein the processor is further configured to perform a balance flushing operation, the event triggers a balance flushing operation, and the threshold is at least one of a group consisting of a fixed threshold, a predetermined threshold, a variable threshold, and a programmable threshold, where the processor is further configured to:

calculate the finish ratio on a per thread basis, not perform the balance flushing operation if the finish ratio is greater than the threshold, and perform the balanced flushing operation if the finish ratio is not greater than the threshold.

19. The system of claim 17, wherein the processor is further configured to:

in response to the finish ratio not being greater than the threshold, move a flushing point in the instruction completion table to at least one of a group consisting of the next unfinished instruction after the next to complete instruction in the instruction completion table or the last consecutive finished instruction after the next to complete instruction in the instruction completion table.

* * * * *